United States Patent Office 3,459,417
Patented Aug. 5, 1969

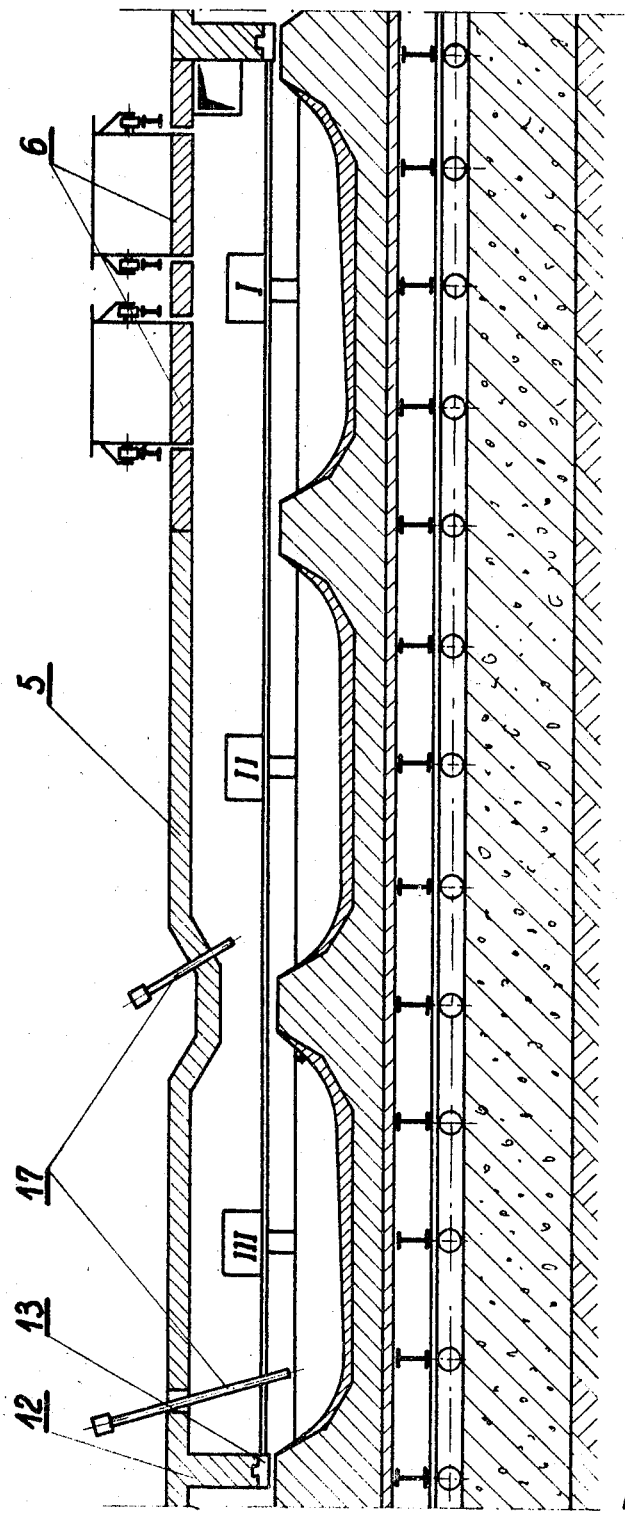

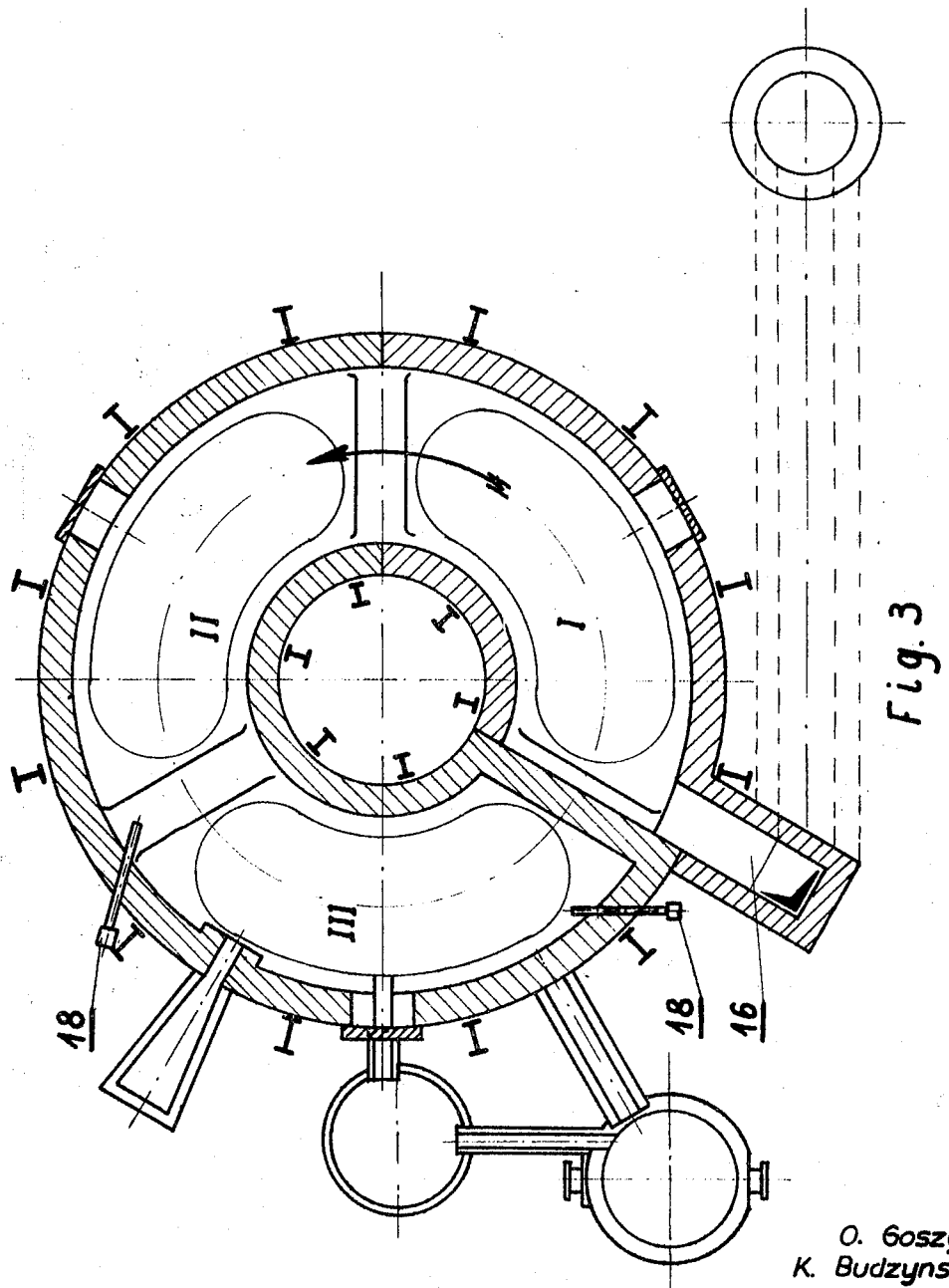

3,459,417
FURNACE FOR THE PRODUCTION OF STEEL
Oskar Goszyk, Gliwice, Kazimierz Budzynski and Leopold Juszczyk, Katowice, Zdzislaw Bonenberg, Zabrze, Daniel Dybal and Stanislaw Sasiadek, Gliwice, and Stanislaw Zakrawacz, Zabrze, Poland, assignors to Biuro Projektow Przemyslu Hutniczego "Biprohut," Gliwice, Poland, a corporation of Poland
Filed Nov. 9, 1966, Ser. No. 593,167
Claims priority, application Poland, Nov. 10, 1965, P 111,541
Int. Cl. C21b *11/08;* C21c *7/00*
U.S. Cl. 266—34                                     3 Claims

ABSTRACT OF THE DISCLOSURE

Apparatus for producing steel in which an annular hearth provided with a plurality of segmental hearth sections is rotated within a furnace housing subdivided into sectoral zones so that a refinable charge is introduced at a first zone and passes successively through a preheating zone (in which the charge is subjected to the hot gases from a subsequent zone) and thence into a refining zone in which the hot gases are generated. The gases flow annularly from the refining zone through the preheating zone and are discharged at the charging zone. Oxygen lances inject oxygen into the molten steel in the refining zone, the molten steel being tapped from the corresponding hearth section before rotation of the hearth carries each section back into the charging zone.

---

The present invention relates to a furnace for producing steel, which is built in form of a ring with three or more melting hearths, where the zones change in function as a result of revolution of the ring hearth; thus the hearth passes from the first zone, i.e. the charging zone, to the second or heating zone and further on to the third zone for melting and refining of the heated charge. Moreover, all the three zones operate simutaneously.

The hitherto known assemblies for steel production are characterized in that the refining is carried out for the most part in one melting hearth, all the processes running successively, one after the other. Of the heat emitted in the operating space, only a small fraction is used for direct heating of the steel; the remaining fraction of the heat contained in the exhaust gases is recovered in special expensive heat exchangers such as regenerators, recuperators and waste-heat boilers.

It is an object of this invention to provide an improved furnace for the production of steel.

In the process of steel production in accordance with this invention, the heat contained in the exhaust gases is used for heating the charge directly in the operational space of the furnace to such a degree that additional heat exchangers become unnecessary.

Our new design of the furnace makes it possible to operate with various conditions of charge and fuel.

First of all, the furnace is designed for the production of steel with use of oxygen, using approximately 50% molten (liquid) pig iron in the charge. In this case, addition of fuel is not necessary. If oxygen and a fuel of high calorific value are added, it is possible to operate the furnace with a smaller proportion of liquid pig iron, possibly with a complete elimination of the latter.

It is also possible to carry out the process with a solid charge and without use of oxygen. This method, however, requires fuel of a high calorific value and preheating of the combustion air.

A furnace according to the invention is shown by way of example in the accompanying drawing, in which:

FIG. 2 represents a developed section of the furnace; and

Figure 1:
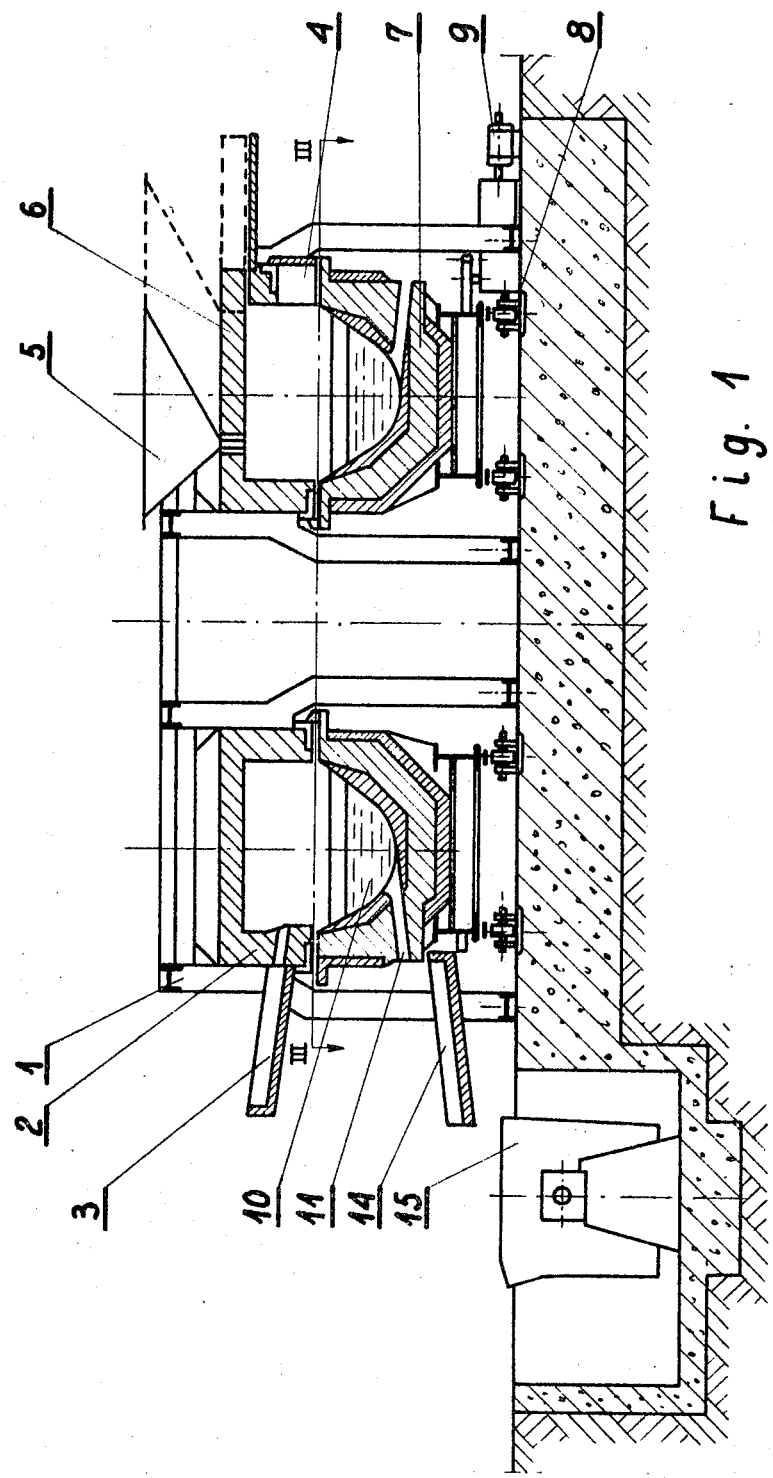
FIG. 1 shows a cross-section of the furnace.

FIG. 3 a section along line III—III of FIG. 1 in horizontal projection of the furnace.

The furnace has the form of a horizontal ring. On a steel support frame 1 of the furnace, there are mounted two cylindrical inner and outer annular side walls 2. In the external wall there are arranged the pouring-in or supply gate in the form of a pig-iron spout 3, and handling holes with covers 4. At the top, the furnace is covered with a roof 5, provided with a charging opening for solid charge closed with a cover 6. The bottom part of the furnace is a ring or annular hearth 7 resting on rollers 8, with horizontal axes; the hearth 7 is rotatable around the vertical axis by means of a drive 9.

In the hearth there are formed three or more melting-hearths sections 10. Each melting hearth is provided with an individual discharge hole 11. Between the side walls 2 there is provided a partition 12 abutting on a beam 13 cooled with water and separating the final zone of the housing from the initial zone.

For tapping the molten steel, a tapping spout 14 is positioned above the casting ladle 15. For flue gases an exhaust stack 16 is designed. Oxygen lances 17 are provided in zones II and III for blowing oxygen onto and into the charge. Burners 18 for fuel of high calorific value are used for additional firing, if required.

All the melting hearths of the furnace hearth contain a charge subjected to successive phases of steel melting.

In hearth I there is performed the charging and preheating of the solid charge. In hearth II, a further heating of the charge is carried out. In hearth III, the pig iron is introduced and refining, finishing and discharging of molten steel is effected. At the melting hearth III, the quantity of air necessary for refining the steel is introuced through nozzles or lances 7. The carbon monoxide formed there is then burned completely with the oxygen blown into the melting hearth II. Hot combustion gases flow above the melting hearth I and are exhausted at the chimney 16 so that the heating gases flow annularly in the direction counter to the direction of rotation of the hearth. In this way the heat of combustion gases is better utilized.

What we claim is:
1. A furnace for the production of steel, comprising:
    an annular furnace housing surrounding a vertical axis and formed with at least one charging zone, at least one preheating zone and at least one refining zone therearound;
    an annular hearth received in said housing and rotatable therein about said axis, said hearth being provided with a plurality of generally sectoral hearth sections successively passing through said zones upon rotation of said hearth;
    driving means for rotating said hearth relatively to said housing about said axis;
    means at said charging zone for introducing respectively refinable charges into said sections as they successively traverse said charging zone;
    means at said refining zone for tapping a molten refined product from said sections upon successive traverses of said refining zone by said sections upon rotation of said hearth; and
    means at said refining zone for subjecting the charges in said sections of said hearth to an elevated temperature sufficient to refine the charges and form said molten refined product.

2. The furnace defined in claim 1 wherein the last-mentioned means generates a hot gas within said refining zone, said housing being constructed and arranged to conduct said gas successively through said zones in a sense opposite to the sense of rotation of said hearth, said housing being formed with exhaust means at said charging zone for venting the gas from said housing upon successive passage of the gas through said zones.

3. The furnace defined in claim 1, further comprising at least one oxygen lance at said refining zone for introducing oxygen into the charges contained in said sections of said hearth as they pass successively through said refining zone.

References Cited

UNITED STATES PATENTS

| 2,603,476 | 7/1952 | Whiston | 266—33 |
| 3,377,050 | 4/1968 | Ankersen | 266—33 |
| 3,215,424 | 11/1965 | Kanamori | 266—34 |

J. SPENCER OVERHOLSER, Primary Examiner

R. SPENCER ANNEAR, Assistant Examiner

U.S. Cl. X.R.

266—33